W. H. COOK.
WASHER FOR LOCKING NUTS, BOLTS, AND THE LIKE.
APPLICATION FILED MAR. 25, 1918.
1,315,469.
Patented Sept. 9, 1919.
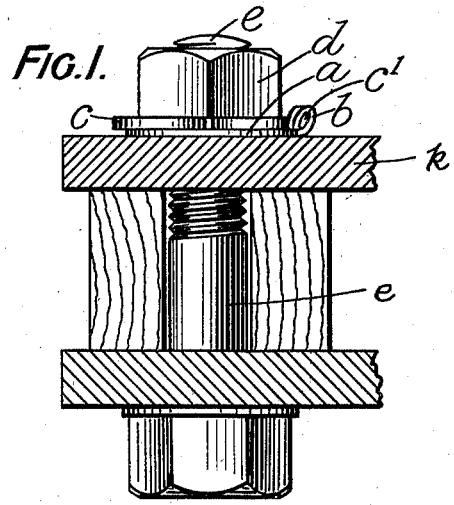
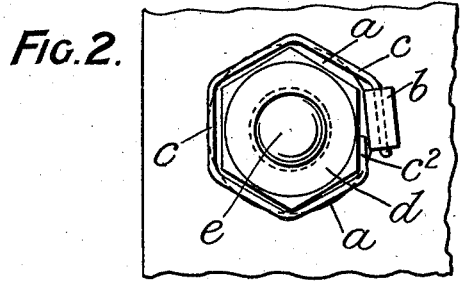
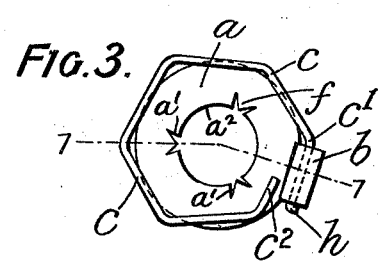
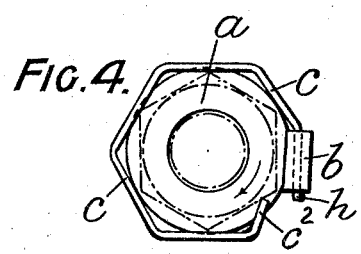
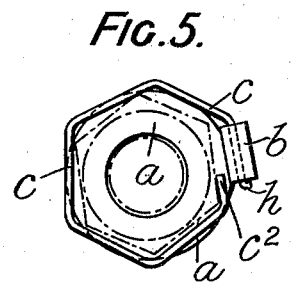
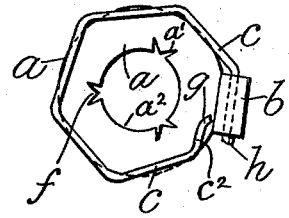
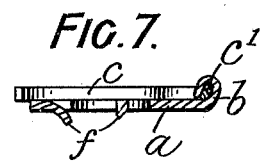
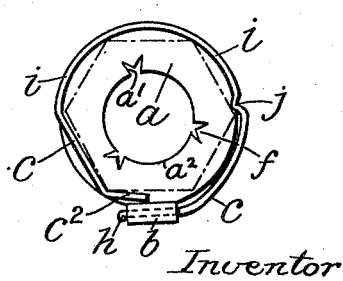
Inventor
Walter Herbert Cook.
By J. Walter Fowler
Atty.

UNITED STATES PATENT OFFICE.

WALTER H. COOK, OF LONDON, ENGLAND.

WASHER FOR LOCKING NUTS, BOLTS, AND THE LIKE.

1,315,469.  Specification of Letters Patent.  Patented Sept. 9, 1919.

Application filed March 25, 1918. Serial No. 224,584.

*To all whom it may concern:*

Be it known that I, WALTER HERBERT COOK, a subject of the King of England, residing at London, England, have invented certain new and useful Improvements in Washers for Locking Nuts, Bolts, and the like, of which the following is a specification.

This invention relates to improvements in washers for locking nuts, bolts and the like, such washers having means for gripping and engaging the bolt and for holding the head or nut against vibration. In the well-known fastnut washer of that type bent prongs project inwardly and engage the bolt or screw as the nut or head is screwed down, and have oppositely projecting spring arms carried by the washer to engage the corners of the nut so as to prevent the latter from rotating backward under shocks or vibration. Such an arrangement is described and claimed in my prior Patent of the United States No. 875,782 of 1908.

The present invention has for object to prevent the gripping means such as the spring fingers or arms from being bent or broken, and also to prevent damage by the gripping means. The present invention further provides means for resisting in an even more pronounced manner the backward rotation of the nut by reason of vibration, after the said nut has been screwed up upon the bolt and washer.

According to the present invention, the washer is provided with an embracing member anchored at one end and free at the other end, and this embracing member is so secured to the washer that it incloses practically the whole outline or periphery of the nut. This member has two or more angular arms and extends around the nut and by reason of the one free end, the embracing member can yield outwardly and allow the corners of the nut to ride over the angular arms when the nut is being screwed up: when, however, the nut tends to unslacken or to turn back (by reason, for example, of vibration) the free end of the embracing member is longitudinally carried around by the nut and the whole member thereupon engages and grips the nut and stops its further unslackening. If desired, the free end of the embracing member may make contact with a stop piece (which may be the anchoring support for the fixed end of the embracing member) when the nut has commenced to unslacken, through vibration or otherwise, and so lock the nut against further backward movement. The embracing member may also be provided with a crimp which will be engaged by a corner of the nut during the backward rotation of the nut and tend to make the embracing member bind upon the nut.

Upon the accompanying sheet of drawings, Figure 1 is a side elevation of a bolt fitted with the improved washer. Fig. 2 is a plan of the same. Fig. 3 is a plan of the washer alone. Fig. 4 is a plan of the washer showing the nut being screwed up. Fig. 5 is a similar view showing the nut tending to unslacken and being held by the embracing member. Fig. 6 is a plan showing a modified extremity to the embracing member. In this view the position the nut would occupy is indicated by dotted lines. Fig. 7 is a section through the washer of Fig. 3 on line 7—7. Fig. 8 is a plan view of another form of embracing member.

In the exemplification shown I provide the washer $a$ upon its external periphery (or adjacent thereto) with a turned over lip or upright lug $b$. The washer is shown as annular. The lug $b$ engages and holds one end $c'$ of an embracing member of spring metal $c$ which is adapted to fit around the nut $d$, the head of the bolt or other article to be locked against backward rotation. The embracing member $c$ is thus anchored at one end to the lip or lug $b$ upon the washer $a$. This washer $a$ is slipped around the member, such as the screwed-bolt $e$, the head or nut on which is to be secured against vibration.

The washer is approximately annular, its middle portion being removed by stamping or otherwise and is shown provided with a series of notches $a'$ in the inner periphery $a^2$ to afford teeth or prongs $f$ projecting below the plane of the washer $a$. The construction of the washer and its prongs will be clear from Fig. 7, the prongs extending beyond the inner periphery of the washer when ultimately partially closed up again toward the plane of the washer to bite into the bolt $e$ in the known manner. In this way the washer $a$ can be firmly engaged with its bolt, when the nut is screwed down upon the washer.

The other extremity $c^2$ of the embracing member $c$ is free and ends adjacent to a fixed stop upon the washer such as that end of the lip or lug $b$ opposite to the end from which the anchored end of the member projects, but the free end $c^2$ of the embracing member is not normally in contact with the fixed stop such as lip or lug $b$, there being a small gap therebetween. The embracing member is free at that end $c^2$ toward which the nut is turned when being screwed up. In the drawings a bolt $e$ having a right-hand thread is shown.

The embracing member $c$ is shaped to fit the nut or head of the bolt it is intended to lock, being of square, hexagonal or other corresponding shape, and regarding the lip or lug $b$ as one face of the embracing member. By reason of the free end $c^2$ to the embracing member, the nut or bolt head as it is screwed up upon the bolt and washer (see Fig. 4), will, at its corners, "ratchet" over or ride over the angular faces or bars of the embracing member $c$, because the latter is of spring metal and can yield or expand outwardly to a circle described by the corners of the nut: see Fig. 4. When the nut is tightened up in place and the hard prongs $f$ of the known "fastnut" type carried by the inner periphery of the washer have engaged the bolt or screw, the embracing member $c$ will close upon the nut and thereafter any liability or attempt of the nut to rotate backward (or unslacken) will result in the embracing member $c$ tending to be wound longitudinally upon the nut, that is to say instead of the member $c$ yielding outwardly, the free end $c^2$ of the embracing member will be carried around toward the lip or lug $b$ (see Fig. 5) with a contractile action upon the nut, thereby closing the aforesaid gap and the free end $c^2$ will eventually abut against the lip or lug $b$, thus forming a cage which imprisons the nut and prevents its further backward rotation.

It will be understood that the nut may possibly rotate backward until the gap is closed but thereafter the embracing member cannot yield outwardly since its extremity $c^2$ abuts against the rigid lip or lug. Preferably the free end $c^2$ of the embracing member is formed or shaped to contact with that face of the lip or lug $b$, which is nearer the inner periphery of the washer, so that the more the nut tends to rotate backward (by reason of shock or vibration) the tighter the anchored cage formed by the embracing member incloses the nut. The free end is shown in Fig. 6 provided with a cranked, out-turned or oblique extremity $g$ adapted to make contact with the lug $b$.

The embracing member $c$ upon the side remote from the lip or lug $b$ may be symmetrical, but the angular bars of $c$ nearer to the lip or lug $b$ are the one $c'$ anchored thereto and the other $c^2$ preferably cranked at its extremity and bent toward the lip or lug without normally making contact therewith.

In the arrangement shown in Fig. 8, the embracing member is provided with a part-circular portion $i$ and with a crimp $j$. The portion $i$ does not impede the nut when the latter is turned in either direction but when the nut tends to turn back, due to vibration, one corner of the nut engages the free end $c^2$ of the embracing member $c$ and pulls it toward the lug $b$ thereby tightening the member $c$ upon the nut and this action is intensified because another corner of the nut will engage the crimp $j$ and also assist the contractile action of the member $c$ upon the nut.

When it is desired to slacken the nut by a spanner or otherwise voluntarily, a screw driver or other device may be inserted in the gap between $b$ and $c^2$ to deflect the free end $c^2$ of the embracing member outwardly so that the nut can be turned back and "ratchet" or ride over the angular faces or bars of the embracing member.

The anchored end $c'$ of the embracing member $c$ may be provided with a flanged or out-turned extremity $h$ to prevent it from being drawn through the lip or lug $b$ when the nut is tending to rotate backward.

In the drawings, Fig. 1, the washer $a$ is shown by way of example between the nut $d$ and a plate $k$. Obviously the prongs $f$ can be forced into the screw bolt by means of a second or lock nut in the known manner.

Having thus described my invention, what I claim as such and desire to secure by Letters Patent of the United States, is:—

1. A locking device for bolts, nuts and the like, comprising a washer, prongs projecting inwardly of the washer and adapted to be forced into the support around which the washer is fitted, a fixed stop upon said washer, an embracing member rigidly secured at one end to said washer, said embracing member being bent around the member to be locked and having a free extremity at the other end, said free extremity terminating adjacent to but normally not in contact with the fixed stop upon the washer.

2. A locking device for bolts, nuts and the like, comprising a washer, means for engaging said washer with the support on which it is mounted, a spring-metal sickle-shaped arm secured upon said washer, said arm being fixed at one end and having its other end free with the free end overlapping the fixed end to form a cage for the nut, said arm being adapted at its free end to be engaged by the nut during backward movement of the latter so as to contract and close upon the device to be locked, upon any involuntary reverse movement of said device.

3. A locking device for bolts, nuts and the like, comprising a washer, means for engaging said washer with the support upon which it is mounted, a spring member secured upon said washer, and a fixed stop upon said washer, said spring member being anchored at one end, being passed around the washer and having its opposite end free, said free end being adapted to be held against the said fixed stop upon involuntary reverse movement of the device to be locked.

4. A locking device of the character described, comprising a washer, an anchoring device upon said washer, a spring member secured at one end to said anchoring device and extending around the member to be held against vibration, said spring member adapted to yield outwardly while the member to be locked is being turned in one direction and having a free extremity which is jammed against said anchoring device during involuntary turning of said member in the other direction.

5. A locking device, comprising a washer, means for engaging said washer with a bolt, a fixed stop upon said washer, a spring member carried by said washer, said spring member extending around the member to be locked and having one end fixed with the other end free, said free end overlapping said fixed end, the spring member being adapted to be wound with a contractile action upon the member to be locked, and the free end of said spring member being adapted to abut finally against said fixed stop, upon involuntary return movement of the member to be locked.

6. A locking device comprising a washer, means for engaging said washer with a bolt, a fixed stop upon said washer, a spring member carried by said washer, said spring member being passed around the member to be locked and having one end fixed while the opposite end is free, said spring member having a part-circular portion and a cranked extremity, and being adapted to yield outwardly during rotation in one direction of the member to be locked, the cranked extremity being arranged to be forced against said stop upon involuntary movement in the other direction of the member to be locked.

7. A locking device comprising a washer, means for engaging said washer with a bolt, a fixed stop upon said washer, a spring member carried by said washer, said spring member being passed around the member to be locked and having one end fixed while the opposite end is free, said spring member being anchored at its fixed end in said fixed stop, said spring member having a part-circular portion and a cranked extremity, the latter being adapted to be forced against said stop upon involuntary reverse movement of the member to be locked.

8. A locking device comprising a washer, means for engaging said washer with a bolt, a fixed stop upon said washer, a spring member carried by said washer, a part-circular portion to said spring member, an inwardly directed crimp in said part-circular portion, said spring member being adapted to be passed around the rotatable member to be locked and having one end fixed relatively to the washer and the other end normally free, the free end of said spring member being adapted to be forced against said stop upon involuntary reversing movement of the member to be locked.

9. A nut locking device, comprising a washer, said washer being adapted to be slipped upon a bolt and engaged with said bolt, a spring member carried by said washer and adapted to embrace the nut, said spring member having one end fixed relatively to the washer and the opposite end free with said free end overlapping said fixed end, said spring member being capable when the nut is being screwed up of yielding outwardly, the spring member at its free end being capable of riding over the corners of the nut during the screwing up motion but being caused to close upon the nut with a contractile action until it abuts against the said fixed stop upon involuntary return movement of the nut.

10. A locking device for nuts, comprising a washer, inwardly directed prongs upon said washer, a lug upon said washer, a spring member anchored at one end to said lug and extending around the corners of the nut, said spring member having a free opposite end, and said free end being adapted to be forced against said lug during involuntary slackening movement of the nut and thereby grip the nut.

11. A nut-locking device, comprising a washer, prongs upon said washer adapted to be forced into the nut-bolt, a lug upon said washer, a spring member anchored at one end to said lug and extending around the corners of the nut, a part-circular portion to said spring member, said spring member having one end anchored in the lug and its opposite end free, and an inwardly directed crimp upon said part-circular portion of the spring member.

12. A locking device for nuts, comprising a washer, prongs upon said washer adapted to be forced into the bolt, an upturned lug upon said washer, a spring member passed at one end through said lug and having an outturned extremity at that end to prevent the anchored end from being drawn through said lug, said spring member being adapted to be passed around the nut and having its opposite end free, said free end of the spring member being capable of being forced against the lug so as to embrace and hold the nut against involuntary slackening.

13. In a device of the character described, the combination of a washer, a fixed stop upon the washer with a spring member which is secured upon the washer and is adapted to encircle the nut, one end of said spring member being anchored to the stop and the other end being free, said free end normally standing adjacent to but not in contact with said fixed stop.

14. In a device of the character described, the combination of a washer, a fixed stop upon the washer with a spring member secured upon the washer and extending around the nut, said spring member having a free end and a cranked extremity to said free end, and a part-circular intermediate portion to said spring member, said cranked extremity being adapted to make contact with said fixed stop during the involuntary unslackening of the nut so as to hold the nut against further unslackening.

In testimony whereof I have affixed my signature in presence of two witnesses.

WALTER H. COOK.

Witnesses:
 VICTOR F. FEENY,
 SAMUEL EVANS.

Copies of this patent may be obtained for five cents each, by addressing the "Commissioner of Patents, Washington, D. C."